(12) United States Patent
Lingenfelser et al.

(10) Patent No.: US 9,225,274 B2
(45) Date of Patent: Dec. 29, 2015

(54) METHOD AND APPARATUS FOR ESTIMATING ANGLES IN A SYNCHRONOUS MACHINE

(75) Inventors: Christian Lingenfelser, Hambruecken (DE); Eckart Mayer-John, Stuttgart (DE); Gunther Goetting, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 14/122,479

(22) PCT Filed: Apr. 5, 2012

(86) PCT No.: PCT/EP2012/056299
§ 371 (c)(1),
(2), (4) Date: Feb. 4, 2014

(87) PCT Pub. No.: WO2012/163585
PCT Pub. Date: Dec. 6, 2012

(65) Prior Publication Data
US 2014/0184120 A1 Jul. 3, 2014

(30) Foreign Application Priority Data
May 30, 2011 (DE) .......................... 10 2011 076 734

(51) Int. Cl.
*H02P 1/04* (2006.01)
*H02P 6/18* (2006.01)
(Continued)

(52) U.S. Cl.
CPC ........ *H02P 6/183* (2013.01); *H02P 6/16* (2013.01); *H02P 21/146* (2013.01); *H02P 23/12* (2013.01); *H02P 23/14* (2013.01); *H02P 25/023* (2013.01)

(58) Field of Classification Search
CPC ............................ H02P 25/023; H02P 21/13

USPC .................................................... 318/400.33
See application file for complete search history.

(56) References Cited

U.S. PATENT DOCUMENTS 7,294,988 B2 * 11/2007 Ajima et al. .................. 318/712
7,728,543 B2 * 6/2010 Takemori et al. ............. 318/685
(Continued)

FOREIGN PATENT DOCUMENTS

DE        102007052365       5/2009
EP           1612927            1/2006
(Continued)

OTHER PUBLICATIONS

Linke, M., et al.: "Sensorless position control of Permanent Magnet Synchronous Machines without Limitation at Zero Speed", IEEE IECON '02 1, 2002, pp. 674-679.
(Continued)

*Primary Examiner* — Erick Glass
(74) *Attorney, Agent, or Firm* — Michael Best & Friedrich LLP

(57) ABSTRACT

The invention relates to an apparatus for estimating angles in a synchronous machine (11), having an angle sensor device (15) which is designed to determine event-discrete measured values for a rotor angle ($\varphi$) of a rotor of the synchronous machine (11) and to output a measurement signal dependent on the determined measured values, an estimation device (16) which is designed to record current and/or voltage signals from the synchronous machine (11), to calculate a deviation ($\Delta\varphi$) of the rotor angle ($\varphi$) of the rotor of the synchronous machine (11) from an expected rotor angle on the basis of the recorded current and/or voltage signals and to output a deviation signal dependent on the calculated deviation ($\Delta\varphi$), and a combining device (17) which is designed to receive the measurement signal and the deviation signal and to calculate an estimated value ($\hat{\varphi}$) for the rotor angle ($\varphi$) of the rotor of the synchronous machine (11) from a combination of the measurement signal and the deviation signal.

9 Claims, 2 Drawing Sheets

(51) Int. Cl.
*H02P 6/16* (2006.01)
*H02P 21/14* (2006.01)
*H02P 23/12* (2006.01)
*H02P 23/14* (2006.01)
*H02P 25/02* (2006.01)

(56) References Cited

U.S. PATENT DOCUMENTS

| | | | |
|---|---|---|---|
| 2005/0104551 | A1 | 5/2005 | Nishimura et al. |
| 2008/0265809 | A1* | 10/2008 | Ol et al. .................. 318/139 |
| 2010/0109584 | A1 | 5/2010 | Kwon et al. |
| 2012/0059642 | A1 | 3/2012 | Vollmer et al. |
| 2012/0086375 | A1* | 4/2012 | Hirono .................. 318/400.34 |

FOREIGN PATENT DOCUMENTS

| | | |
|---|---|---|
| EP | 1885054 | 2/2008 |
| EP | 1944860 | 7/2008 |
| JP | 9056199 | 2/1997 |
| JP | 2001211698 | 8/2001 |
| JP | 2005039889 | 2/2005 |
| JP | 2008072820 | 3/2008 |
| JP | 2010063208 | 3/2010 |

OTHER PUBLICATIONS

International Search Report for Application No. PCT/EP2012/056299 dated Apr. 17, 2013 (English Translation, 3 pages).

* cited by examiner

METHOD AND APPARATUS FOR ESTIMATING ANGLES IN A SYNCHRONOUS MACHINE

BACKGROUND OF THE INVENTION

The invention relates to a method and an apparatus for estimating angles in a synchronous machine, in particular in a permanent-magnet synchronous machine.

In order to operate permanent-magnet synchronous machines which are used, for example, in electrical drive technology for electrically operated vehicles such as electric vehicles or hybrid vehicles, it is necessary to know the rotor angle, that is to say the position of the rotor of the synchronous machine with respect to its rotational movement around the rotor shaft. This measurement variable is needed to match the generation of torque to the actual rotor position.

The rotor angle may be determined, for example, with the aid of angle sensors. However, such angle sensors, in particular angle sensors with a high resolution, may give rise to considerable costs when producing electrical drive systems. Therefore, cost-effective angle sensors with a correspondingly lower angular resolution are often used. The document DE 10 2007 052 365 A1, for example, discloses a method for determining a rotor angle of a synchronous machine with the aid of a low-resolution angle sensor and a Kalman filter.

Alternatively, instead of measuring the rotor angle using angle sensors, it is possible to carry out an estimation on the basis of current and/or voltage sensors. In this case, it is possible to use so-called active methods, that is to say methods in which an additional voltage signal is modulated onto the supply voltage applied to the machine and currents induced by this additional voltage signal in the machine are measured. With a suitable design of the machine, that is to say with sufficient magnetic anisotropy for example, the instantaneous rotor angle can be inferred from the measured currents. For example, the document Linke, M., et al.: "Sensorless position control of Permanent Magnet Synchronous Machines without Limitation at Zero Speed", IEEE IECON '02 1, 2002, pages 674-679, discloses sensorless methods in which radio-frequency signals are injected into the supply voltage of the machine, and in which response signals induced by the radio-frequency signals in the machine are measured and allow the rotor angle to be estimated.

However, the known methods for determining the rotor angle are suitable only for particular restricted speed ranges. For example, safety requirements which are imposed on the electrical drive of an electric vehicle or hybrid vehicle cannot always be ensured when using sensorless methods. On the other hand, methods with low-resolution angle sensors are inferior to other methods in low speed ranges on account of the insufficient measurement data.

There is a need for solutions for determining rotor angles in a synchronous machine which make it possible to regulate torques in a more robust, reliable and powerful manner in all speed ranges of the synchronous machine without having to resort to cost-intensive high-resolution angle sensors.

SUMMARY OF THE INVENTION

The present invention therefore provides an apparatus for estimating angles in a synchronous machine, having an angle sensor device which is designed to determine event-discrete measured values for a rotor angle of a rotor of the synchronous machine and to output a measurement signal dependent on the determined measured values, an estimation device which is designed to record current and/or voltage signals from the synchronous machine, to calculate a deviation of the rotor angle of the rotor of the synchronous machine from an expected rotor angle on the basis of the recorded current and/or voltage signals and to output a deviation signal dependent on the calculated deviation, and a combining device which is designed to receive the measurement signal and the deviation signal and to calculate an estimated value for the rotor angle of the rotor of the synchronous machine from a combination of the measurement signal and the deviation signal. This makes it possible to advantageously combine two determination methods in an integrated approach, thus enabling reliable operation of the synchronous machine in all speed ranges.

The use of two methods also provides redundancy which provides increased failure safety of the angle sensor device, for example. In addition, the angle sensor device may be equipped with a low-resolution and therefore cost-effective angle sensor, in which case the associated smaller number of measured values can be compensated for by the deviation signals from the estimation device. In addition, the apparatus according to the invention provides the advantage that no additional hardware, for example additional sensors or the like, is needed with respect to the already available components of a control system for synchronous machines.

According to another embodiment, the invention provides a method for estimating angles in a synchronous machine, having the steps of determining event-discrete measured values for a rotor angle of a rotor of the synchronous machine with the aid of an angle sensor, recording current and/or voltage signals from the synchronous machine and calculating a deviation of the rotor angle of the rotor of the synchronous machine from an expected rotor angle, and calculating an estimated value for the rotor angle of the rotor of the synchronous machine by combining the determined measured values and the calculated deviation.

In one preferred embodiment, the apparatus has, as a combining device, a Kalman filter which has a prediction device, which is designed to calculate a prediction value for the state vector of a dynamic model of the rotor, and a correction device which is designed to calculate a correction signal on the basis of the prediction value.

In this case, the Kalman filter may also have a determination device which is designed to determine, after the prediction value has been calculated by the prediction device, whether the measurement signal has an up-to-date measured value, the correction device being designed to calculate the correction signal on the basis of the measurement signal if the determination device determines that there is an up-to-date measured value, and the correction device being designed to calculate the correction signal on the basis of the deviation signal if the determination device determines that there is no up-to-date measured value. The use of a Kalman filter enables data fusion of measured value data from an angle sensor device and deviation data from an estimation device which resorts to current and/or voltage signals from the synchronous machine. Data fusion may advantageously prioritize the correction values used: the measured values from the angle sensor device which are updated less frequently than the deviation signals may preferably be used to calculate the correction signal for the Kalman filter if an up-to-date value is present, whereas the deviation signals from the estimation device are used to calculate the correction signal at times at which there is just no up-to-date or updated measured value. This makes it possible to intercept fluctuations in the update frequency of the measured values by means of the angle sensor devices, in particular in low speed ranges in which fewer measured values tend to be able to be recorded by the angle sensor device than in high speed ranges.

The estimation device may preferably be designed to calculate the deviation of the rotor angle on the basis of current output signals from the synchronous machine which are induced by test voltage signals injected into a supply voltage of the synchronous machine. This procedure is also referred to as an active test signal method. As a result, the rotor angle can be estimated in a manner decoupled from the actual supply voltage. In particular, active methods make it possible to adapt the amplitude and/or frequency of the test voltage signals to the operating state of the synchronous machine, with the result that a robust angle estimation is ensured in critical operating states or at low speeds. Moreover, the adaptation of the frequency of the test voltage signals makes it possible to ensure a sufficient frequency spacing with respect to the frequency of the supply voltage.

Alternatively, the estimation device may be designed to calculate the deviation of the rotor angle on the basis of reverse voltage signals from the synchronous machine. These methods are also referred to as passive estimation methods. One advantage is that the deviation signals can be determined from output signals from the synchronous machine which are already present anyway, without the need for active intervention in the control of the machine. In particular, the passive methods are primarily suitable for medium and higher speeds, whereas the active test signal method has an upper limit in terms of the speed.

BRIEF DESCRIPTION OF THE DRAWINGS

Further features and advantages of embodiments of the invention emerge from the following description with reference to the accompanying drawings.

In the drawings.

DETAILED DESCRIPTION

Figure 1:
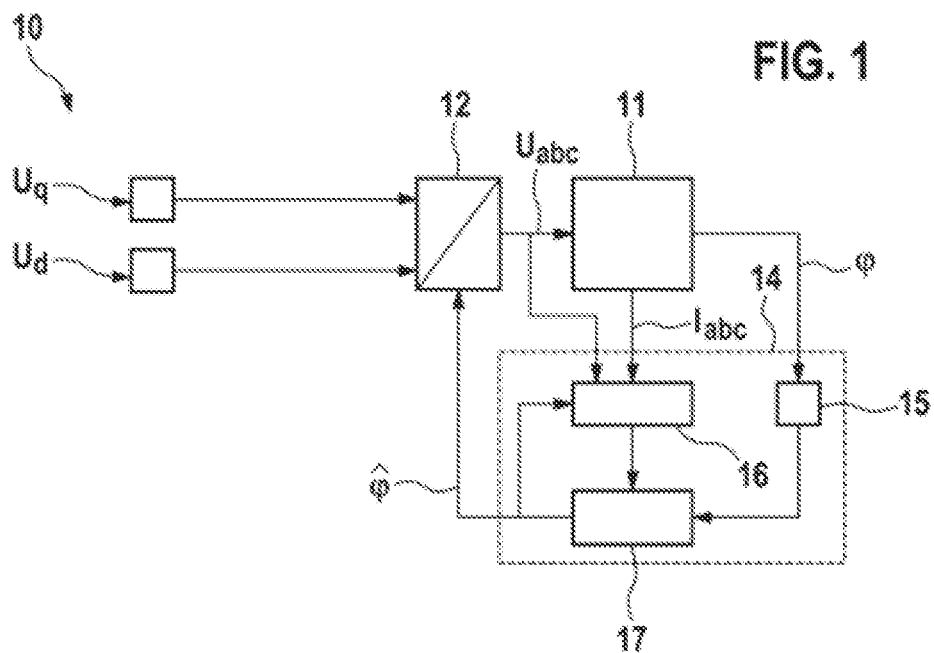
FIG. 1 shows a schematic illustration of a system for estimating angles in a synchronous machine according to one embodiment of the invention.

FIG. 1 shows a schematic illustration of a system 10 for estimating angles in a synchronous machine 11. In this case, the synchronous machine 11 may be a permanent-magnet synchronous machine, for example. The three-phase supply voltage $U_{abc}$ for the synchronous machine 11 may be provided via a supply voltage device 12. In this case, the supply voltage device 12 may have a transformation device which can be used to transform supply voltage signals $U_q$, and $U_d$ from a rotor-fixed d-q coordinate system into a stator-fixed coordinate system. The output signals from the transformation device may be supplied to a PWM signal generator which controls an inverter included in the supply voltage device 12. The three-phase supply voltage $U_{abc}$ can be delivered to the synchronous machine 11 via the inverter. In this case, the torque of the synchronous machine 11 and the formation of magnetic fields by the synchronous machine 11 can be regulated using the supply voltage component $U_q$, whose voltage vector is transverse to the rotor field direction, and using the supply voltage component $U_d$ whose voltage vector is in the rotor field direction.

The system 10 also comprises an apparatus 14 which is coupled to the synchronous machine. The apparatus 14 is designed to calculate an estimated value $\hat{\phi}$ for the rotor angle $\phi$ of the synchronous machine 11 and to feed it back to the supply voltage device 12. Vector regulation in the supply voltage device 12, in particular torque regulation by means of corresponding adjustment of the supply voltage components $U_d$ and $U_q$, can be achieved using the estimated value $\hat{\phi}$.

The apparatus 14 may comprise, for example, an angle sensor device 15 which can detect the rotor angle $\phi$ of the synchronous machine. For this purpose, the angle sensor device 15 can record event-discrete measured values for the rotor angle $\phi$, that is to say measured values which are recorded at particular intervals of time, the sequence of which depends on the rotational speed of the rotor or other parameters such as the control device load, for example. The event-discrete measured values may be processed by the angle sensor device 15 and may be output as the measurement signal. In other words, the measurement signal is characterized by the fact that it is updated with a recently recorded measured value at periodic intervals of time (variable frequency). In this case, the update times depend, for example, on the rotational speed of the rotor.

In this case, the number of measured values recorded by the angle sensor device 15 per unit time also depends on the angular resolution of the angle sensor used. The lower the angular resolution of the angle sensor, the more rarely the measurement signal is updated with new measured values. In the sense of the invention, a measured value for the rotor angle $\phi$, which is newly recorded by the angle sensor device 15, is referred to as an up-to-date measured value at the time at which the previous last measured value of the measurement signal is replaced. In other words, if the measurement signal output by the angle sensor device 15 experiences a change in the last measured value, there is an up-to-date measured value. If the last measured value of the measurement signal does not change, for example because the rotor is in an intermediate stage between the recording of two successive measured values, there is no up-to-date measured value.

The apparatus 14 also comprises an estimation device 16 which is coupled to the synchronous machine 11 and is designed to record current and/or voltage signals, for example a current signal $I_{abc}$ in the stator-fixed coordinate system of the synchronous machine 11, to calculate a deviation $\Delta\phi$ of the rotor angle $\phi$ from an expected rotor angle on the basis of the recorded current and/or voltage signals and to output a deviation signal dependent on the calculated deviation $\Delta\phi$. It is possible, for example, for the estimation device 16 to record a reverse voltage signal from the synchronous machine 11 and to determine the deviation $\Delta\phi$ of the rotor angle $\phi$ using the angle dependence of the reverse voltage with reference to a corresponding model. In this case, the reverse voltage is an induced voltage caused by the rotation of the rotor in the coils of the stator, which voltage is dependent on the rotor speed and the torque regulation and therefore allows a conclusion to be drawn on the rotor angle $\phi$.

The apparatus 14 also comprises a combining device 17 which is designed to receive the measurement signal from the angle sensor device 15 and the deviation signal from the estimation device 16 and to calculate the estimated value $\hat{\phi}$ for the rotor angle $\phi$ of the rotor of the synchronous machine 11 from a combination of the measurement signal and the deviation signal. In this case, the estimated value $\hat{\varphi}$ can be fed back to the supply voltage device 12 and the estimation device 16 via a feedback path.

Figure 2:
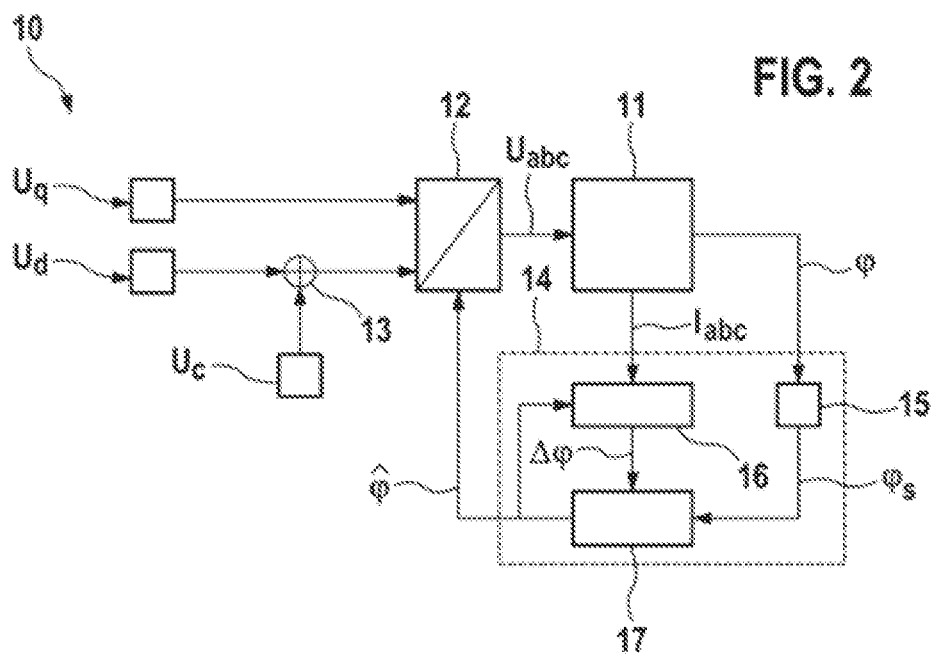
FIG. 2 shows a schematic illustration of a system for estimating angles in a synchronous machine according to another embodiment of the invention.

FIG. 2 shows a schematic illustration of the system 10 for estimating angles in a synchronous machine 11. The system 10 in FIG. 2 differs from the generally illustrated system in FIG. 1 substantially in that the combining device 17 comprises a Kalman filter and an active test signal method is implemented in the estimation device 16. Alternatively, the combining device 17 may also be in the form of an observer structure. The Kalman filter is explained in more detail further below in connection with FIG. 3.

The system 10 in FIG. 2 comprises, in the path of the supply voltage component $U_d$, a mixer 13 which can be used to inject a test voltage signal $U_c$ into the supply voltage component $U_d$. For this purpose, provision may be made, for example, for a test voltage signal $U_c=|U_c|*\cos(\omega_c t+(\varphi_c)$ having an amplitude $|U_c|$ and a frequency $\omega_c$ to be modulated onto the supply voltage component $U_d$. In this case, the frequency $\omega_c$ may be greater than the frequency of the fundamental of the injected supply voltage $U_{abc}$, for example, and, in particular, may have a minimum frequency spacing with respect to the latter. In this case, the test voltage signal $U_c$ is injected in the direction of the estimated rotor axis. This induces a current in the synchronous machine 11, the current signal $I_{abc}$ of which may be recorded by the estimation device 16. The estimation device 16 can then determine the deviation $\Delta\varphi$ of the rotor angle cp from an expected rotor angle by evaluating the current signal.

It may be possible to keep the amplitude and/or the frequency of the test voltage signal $U_c$ variable. For example, the frequency of the test voltage signal $U_c$ may be adapted on the basis of the speed. At low speeds, a lower frequency can be selected, for example. The amplitude of the test voltage signal $U_c$ may be adapted to the operating state of the synchronous machine 11 at critical operating points.

The angle sensor device 15 may comprise, for example, digital absolute sensors with a low angular resolution, for example sensors with six edges for each electrical revolution. In this case, it goes without saying that other sensor arrangements can also be used. The angle sensor device 15 may also have incremental angle sensors with or without recognition of the direction of rotation. In the latter case, provision may be made for the starting position of the angle sensors to be ensured by means of a suitable initialization method. The angle sensor device 15 transfers a measurement signal with measured values $\varphi_s$ to the Kalman filter of the combining device 17.

Alternatively, instead of an angle sensor device 15, it is also possible to resort to angle variables which are already present in the synchronous machine 11, for example if the angle sensor device 15 fails. For example, the measured values $\varphi_s$ may also be taken from the angle sensors of the combustion engine of a hybrid vehicle, from the angle sensor of the throttle valve or from the angle sensor of the windscreen wiper.

The estimation device 16 may also be used to calibrate the angle sensor device 15, for example. In particular when removing or after repairing the angle sensor device 15, the estimation device 16 can be designed to carry out a test pulse method which can be used to readjust the electrical angle, that is to say the position of the angle sensor relative to the angular position of the machine coil windings and the permanent magnets. In this case, the calibration can be carried out in a fully automatic manner during restarting.

Figure 3:
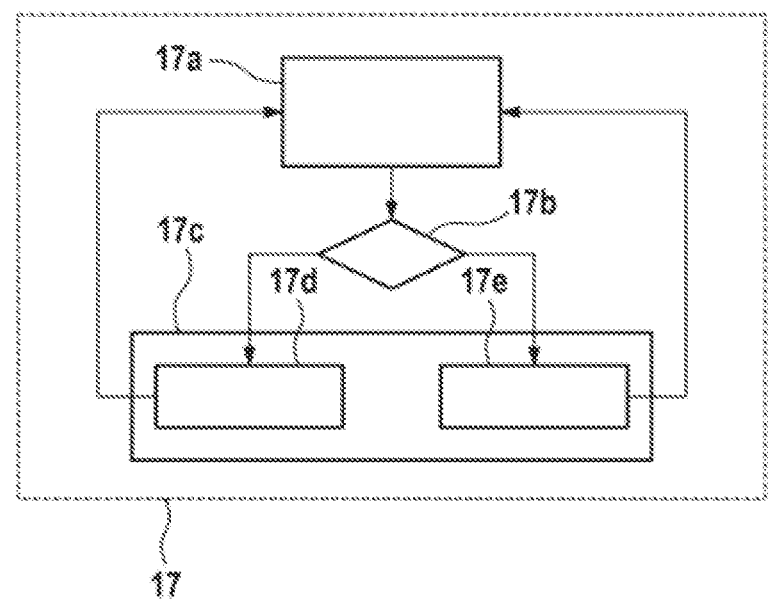
FIG. 3 shows a schematic illustration of a combining device of the systems from FIGS. 1 and 2 according to another embodiment of the invention.

FIG. 3 shows a schematic illustration of a combining device 17 of the system 10 from FIG. 2, which device is in the form of a Kalman filter. The Kalman filter 17 comprises a prediction device 17a which is designed to calculate a prediction value $\hat{x}^{-(k+1)}$ for the state vector $\hat{x}$ of a dynamic model of the rotor on the basis of a previous value $\hat{x}^+(k)$ of the state vector $\hat{x}$. The state vector $\hat{x}$ may be, for example, a three-dimensional vector which describes, as state variables, the system states of the rotor angle $\varphi$, the speed or angular velocity $\dot{\varphi}$ and the load torque M. In this case, the state variables may be linked to one another using a physical model, for example using a system of linear differential equations which describe the dependence of the state variables on one another. In this case, the prediction value $\hat{x}^{-(k+1)}$ may be calculated as the element of a first-order Markov chain with deterministic interference w on the basis of a state transition matrix $A_d$ and a control intervention term $b_d u_k$ which models a control variable $u_k$ weighted with control dynamics $b_d$:

$$\hat{x}^-(k+1)=A_d\hat{x}^+(k)+b_d u_k$$

The prediction device 17a may also calculate a covariance matrix $P^-(k+1)$ for the error covariance expected for the prediction according to the formula $P^-(k+1)=A_d P^+(k)A_d^T+Q$, where $P^+(k)$ is the corrected error covariance matrix of the preceding prediction step and Q is the covariance matrix of the random system noise w.

After the updated prediction value $\hat{x}^-(k+1)$ has been calculated in a prediction step, it is determined whether or not there is an up-to-date measured value $\varphi_s$ of the angle sensor device 15. In this case, the iteration of the updating of the prediction values can be effected at a higher calculation frequency than the frequency at which the measured values of the measurement signal are updated by the angle sensor device 15. In this case, the determination can be carried out in a determination device 17b.

Depending on the result of the determination as to whether or not there is an up-to-date measured value $\varphi_s$ of the angle sensor device 15, the updated prediction value $\hat{x}^-(k+1)$ and the updated error covariance matrix $P^-(k+1)$ can be transferred to a correction device 17c in which a correction signal is calculated on the basis of the up-to-date measured value or the measurement signal (calculation step 17d) if an up-to-date measured value $\varphi_s$ is present. In this case, a corrected prediction value can be calculated according to the formula $$\hat{x}^+(k+1)=\hat{x}^-(k+1)+(k+1)c(c^T P^-(k+1)c+R_2)^{-1}(\varphi_s-c^T\hat{x}^-(k+1)).$$

Furthermore, a corrected error covariance matrix can be calculated according to the formula $$P^+(k+1)=(I-P^-(k+1)c(c^T P^-(k+1)c+R_2)^{-1}c^T)P^-(k+1),$$

where $c^T$ is the observation matrix of the system and $R_2$ is a measurement uncertainty matrix for the angle sensor device 15. The corresponding model parameters for calculating the correction signal may be selected in a manner adapted to the system.

If there is no up-to-date measured value $\varphi_s$, the correction device 17c can calculate the correction signal on the basis of the deviation signal (calculation step 17e). The corrected prediction value can then be calculated according to the formula $$\hat{x}^+(k+1)=\hat{x}^-(k+1)+P^-(k+1)c(c^T P^-(k+1)c+R_1)^{-1}\Delta\varphi$$

and the corrected error covariance matrix can be calculated according to the formula $$P^+(k+1)=(I-P^-(k+1)c(c^T P^-(k+1)c+R_1)^{-1}c^T)P^-(k+1),$$

where $R_1$ is a measurement uncertainty matrix for the estimation device 16.

After the respective calculation steps 17d and 17e, the corrected values from the correction device 17c are transferred back to the prediction device 17a where a new prediction step can then be carried out. The prediction and correction steps can be iteratively repeated in this case.

In this case, the Kalman filter can be adapted in such a manner that the calculation of the estimated value reacts in a particular manner to the fact that an expected update of the measured values is absent, for example on account of a measurement error or a malfunction of the angle sensor device 15. In this case, the angle estimation can then be corrected separately.

The matrices $R_1$, $R_2$ and $Q$ also may not necessarily be selected to be constant, but alternatively may also be selected on the basis of the instantaneous operating point (torque and speed).

In other words, the correction device 17c can use the measured values of the measurement signal from the angle sensor device in a prioritized manner to calculate the correction signal. However, since up-to-date measured values are not present after each prediction step, the correction device 17c can use, as auxiliary values, the deviation signals from the estimation device 16, which are updated after each prediction step, to calculate the correction signal. This makes it possible to calculate the estimated value $\hat{\phi}$ for the rotor angle $\phi$ in a robust and precise manner even with a low-resolution angle sensor which provides updated measured values only sporadically.

If the angle sensor device 15 fails, the electrical drive system can be operated in an emergency mode (so-called "limp-home function"). For this purpose, the combining device 17 can resort solely to the deviation signals from the estimation device 16 in order to regulate the synchronous machine 11. In order to ensure stable operational reliability, the speed range or the power delivered by the synchronous machine 11 can be limited in this case, for example. Provision may also be made for the amplitude of the injected radio-frequency signals to be increased in order to make it possible to robustly detect the induced current signals.

Figure 4:
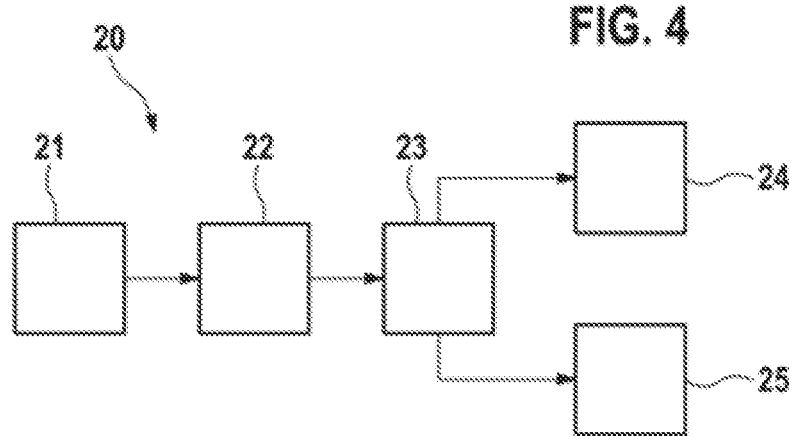
FIG. 4 shows a schematic illustration of a method for estimating angles in a synchronous machine according to another embodiment of the invention.

FIG. 4 shows a schematic illustration of a method 20 for estimating angles in a synchronous machine, in particular a permanent-magnet synchronous machine. In a first step 21, event-discrete measured values are determined for a rotor angle of a rotor of the synchronous machine with the aid of an angle sensor and current and/or voltage signals from the synchronous machine are recorded and a deviation of the rotor angle of the rotor of the synchronous machine from an expected rotor angle is calculated. In a second step 22, a prediction value for the state vector of a dynamic model of the rotor is first of all calculated in a Kalman filter. In a third step 23, it is determined whether there is an up-to-date measured value. If the presence of an up-to-date measured value is determined, a correction signal for the prediction value is calculated on the basis of the up-to-date measured value in a step 24. However, if it is determined that there is no up-to-date measured value, the correction signal for the prediction value is calculated on the basis of the calculated deviation in a step 25.

The invention claimed is:

1. An apparatus for estimating angles in a synchronous machine, the apparatus comprising:
    an angle sensor device which is designed to determine event-discrete measured values for a rotor angle of a rotor of the synchronous machine and to output a measurement signal dependent on the determined measured values;
    an estimation device which is designed to record current and/or voltage signals from the synchronous machine, to calculate a deviation of the rotor angle of the rotor of the synchronous machine from an expected rotor angle on the basis of the recorded current and/or voltage signals and to output a deviation signal dependent on the calculated deviation; and
    a combining device which is designed to receive the measurement signal and the deviation signal and to calculate an estimated value for the rotor angle of the rotor of the synchronous machine from a combination of the measurement signal and the deviation signal
    wherein the combining device includes a Kalman filter or an observer structure which has a prediction device, which is designed to calculate a prediction value for the state vector of a dynamic model of the rotor, and a correction device which is designed to calculate a correction signal on the basis of the prediction value.

2. The apparatus according to claim 1, the Kalman filter or the observer structure also having a determination device which is designed to determine, after the prediction value has been calculated by the prediction device, whether the measurement signal has an up-to-date measured value, the correction device being designed to calculate the correction signal on the basis of the measurement signal if the determination device determines that there is an up-to-date measured value, and the correction device being designed to calculate the correction signal on the basis of the deviation signal if the determination device determines that there is no up-to-date measured value.

3. The apparatus according to claim 1, the estimation device being designed to calculate the deviation of the rotor angle on the basis of current signals from the synchronous machine which are induced by test voltage signals injected into a supply voltage of the synchronous machine.

4. The apparatus according to claim 1, the estimation device being designed to calculate the deviation of the rotor angle on the basis of reverse voltage signals from the synchronous machine.

5. The apparatus according to claim 1, the angle sensor device comprising a digital absolute sensor, an incremental angle sensor with recognition of the direction of rotation or an incremental angle sensor without recognition of the direction of rotation.

6. A method for estimating angles in a synchronous machine, of the method comprising:
    determining event-discrete measured values for a rotor angle of a rotor of the synchronous machine with the aid of an angle sensor;
    recording current and/or voltage signals from the synchronous machine and calculating a deviation of the rotor angle of the rotor of the synchronous machine from an expected rotor angle;
    calculating an estimated value for the rotor angle of the rotor of the synchronous machine by combining the determined measured values and the calculated deviation, wherein calculating the estimated value is carried out in a Kalman filter or an observer device;
    calculating a prediction value for the state vector of a dynamic model of the rotor;
    determining whether there is an up-to-date measured value;
    calculating a correction signal for the prediction value on the basis of the up-to-date measured value if there is an up-to-date measured value; and calculating a correction signal for the prediction value on the basis of the calculated deviation if there is no up-to-date measured value.

7. The method according to claim 6, further comprising: injecting test voltage signals into a supply voltage of the synchronous machine; and calculating the deviation of the rotor angle on the basis of current signals from the synchronous machine which are induced by the test voltage signals.

8. The method according to claim 7, the amplitude and/or frequency of the test voltage signals being adapted to the operating state of the synchronous machine.

9. The method according to claim 6, the deviation of the rotor angle being calculated on the basis of reverse voltage signals from the synchronous machine.

* * * * *